May 27, 1958 R. HÖRTH 2,836,283
BELT CONVEYOR SYSTEM
Filed May 17, 1955 3 Sheets-Sheet 1
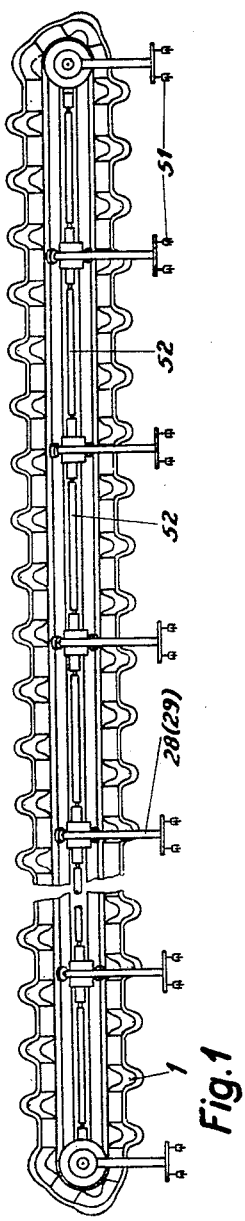
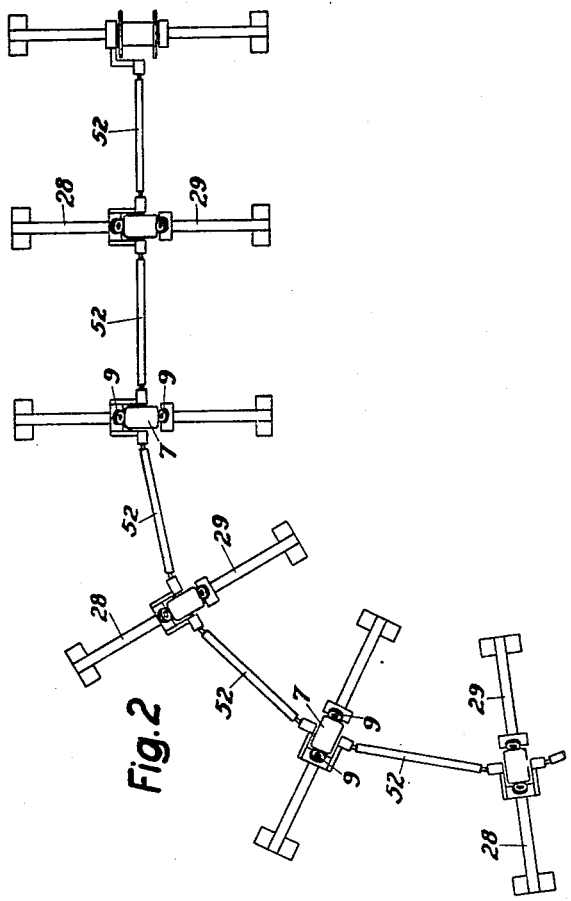
Inventor:
Roberth Hörth

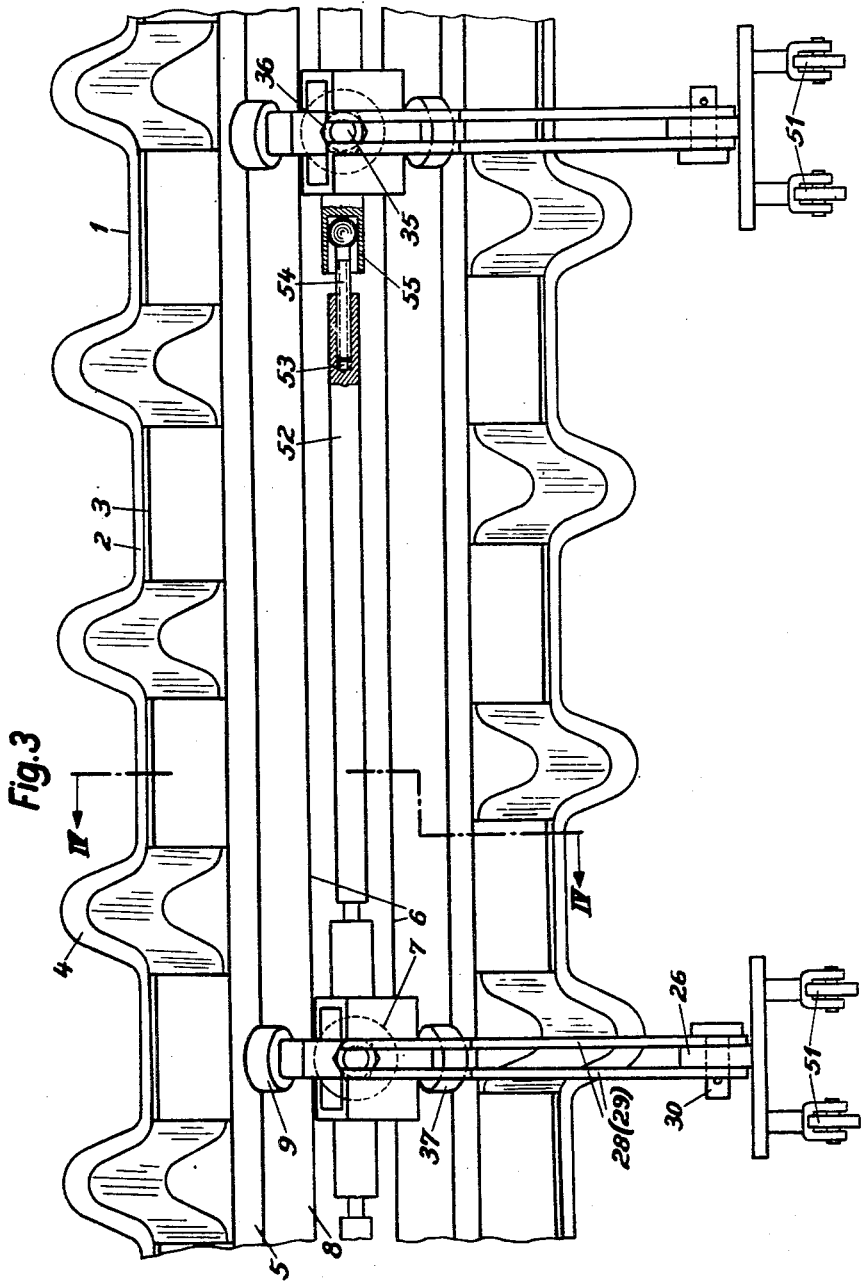

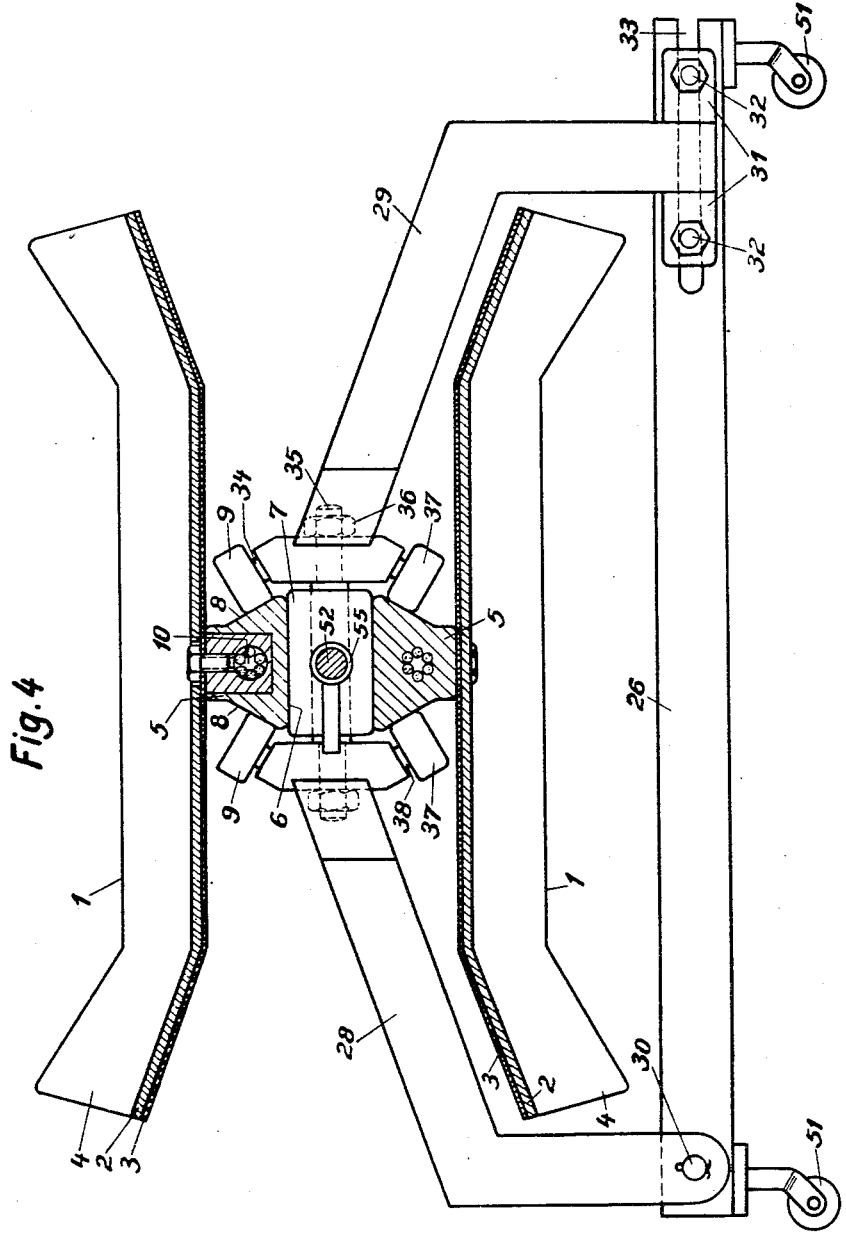

United States Patent Office 2,836,283
Patented May 27, 1958

2,836,283

BELT CONVEYOR SYSTEM

Robert Hörth, Vlotho-Kalldorf, Germany, assignor to Friedrich K. H. Stübbe, Vlotho (Weser), Germany Application May 17, 1955, Serial No. 509,010

Claims priority, application Germany June 2, 1954

3 Claims. (Cl. 198—109)

The present invention relates to a belt conveyor system comprising a belt adapted to pass through curves and carried by stands held at a certain distance from each other by means of thrust members. More specifically, the invention relates to such a belt conveyor system in which the stands are provided with roller sets, while the ends of said belt conveyor system are provided with reversing drums over which the conveyor belt passes. If, with such a belt conveyor system, the dumping station is to be displaced laterally, it is necessary successively to offset relative to each other such a number of adjacent roller stands that the lateral angle formation of the conveyor belt at each roller stand will not exceed a permissible limit, and that the radius of curvature of the conveyor belt between the individual stands will be as uniform as possible. The greater the lateral displacement of the dumping station will be, the greater will be the number of the roller stands to be displaced. The work inherent to the lateral displacement of the dumping station is time-consuming and expensive.

It is, therefore, an object of this invention to provide a belt conveyor system which will overcome the above mentioned drawbacks.

It is another object of this invention to simplify the lateral displacement of the dumping station of a belt conveyor having a belt adapted to pass through curves.

It is a further object of this invention to provide a belt conveyor system having a belt adapted to pass through curves, in which the stands supporting the belt can quickly and easily be adjusted, while the angular position of each two adjacent stands may be varied within predetermined limits.

It is also an object of this invention to provide a conveyor system of the type set forth in the preceding paragraph, in which the acute angle formed by two adjacent supporting stands for the conveyor belt cannot be increased above a predetermined maximum angle.

These and other objects and advantages of the invention will appear more clearly from the following specification in connection with the accompanying drawings, in which:

Fig. 1 illustrates a side view of a belt conveyor system according to the present invention.

Fig. 2 is a top view of the belt conveyor system shown in Fig. 1 while the conveyor belt itself has been removed.

Fig. 3 is a section of the belt conveyor system shown in Fig. 1.

Fig. 4 is a cross section of the belt conveyor system illustrated in Fig. 1, said cross section being taken along the line IV—IV of Fig. 3.

Referring now to the drawings in detail, the belt conveyor system shown therein comprises a conveyor belt 1 adapted to pass through curves. This belt 1 is provided with portions which are bend resistant in transverse direction of the belt and include a rubber cover 2 vulcanized to a reinforcing plate 3. The belt 1 furthermore comprises flexible channel-like sections 4 of rubber which are arranged between said bend-resistant portions. The conveyor belt has associated therewith a pulling or traction member 5 provided with running surfaces 6, 8 for supporting rollers 7, 9. The member 5 is made of rubber and is provided with an inserted core of flexible wire rope 10 which is not stretchable in longitudinal direction.

The conveyor belt 1 is supported by supporting stands which comprise a base 26 and roller supports 28, 29. The roller support 28 shown on the left-hand side of Fig. 4 is pivotally connected to the base 26 by means of a bolt 30. The roller support 29 on the right-hand side of Fig. 4 is laterally displaceably connected to the base 26 by means of fishplates 31 and tightening screws 32 which slide in a slot 33 of the base 26. Rollers 9 are journalled on studs 34 of the roller supports 28, 29. A roller 7 is arranged between the two roller supports 28 and 29 of each roller stand. The roller supports of each stand are detachably interconnected by means of a shaft 35 extending through roller 7 and by means of nuts 36. The roller supports 28, 29 are provided with studs 38 and rollers 37 thereon for the slack strand. The rollers 37 and studs 38 therefor are arranged in the manner of an image with regard to the rollers 9 and studs 34 therefor cooperating with the tight strand. The base 26 of each stand is provided with casters 51. The illustrated arrangement of the supporting members for the casters 51 makes it possible to displace the stands in a direction perpendicular to the conveying direction of the belt as well as in the conveying direction of said belt.

By means of thrust resistant thrust members 52, the stands are linked to each other in longitudinal direction of the conveyor belt 1. The said thrust members 52 are provided with threaded bores 53 into which threaded bolts 54 are screwed so that the length of the thrust members may be varied. The free ends of the bolts 54 are ball-shaped and are journalled in tubular holders or sockets 55 connected to the stands in any convenient manner.

In as much as the conveyor belt in conformity with standard practice is under pulling stress, the supporting members carrying the reversing drums are continuously urged toward each other. However, the distance between the two reversing drums along the central longitudinal axis of the belt cannot shorten itself in view of the thrust members 52 acting as spacers between each two adjacent supports.

As will be seen from Fig. 3, the joints consisting of the bolts 54 and sockets 55 will not permit that a certain relative angular position of two adjacent stands will be exceeded. The magnitude of this angular position is determined by the length of the tubular holder 55 and the play of the bolts 54 in the holders or sockets 55 which, when the conveyor belt system is in assembled condition, always retain the adjacent ends of bolts 54 therein. Thus, if for instance, the dumping station of the belt conveyor is to be displaced laterally, it is merely necessary laterally to displace the stand which carries the reversing drum. As soon as the thrust member 52 which connects this stand with the next following stand is displaced by the admissible maximum angle in the joints 54, 55, and as soon as the joint connection has become stiff, the next following stand will be carried along when the stand supporting the reversing drum is displaced further and will likewise be displaced laterally until also in the joints of the thrust member connecting this stand with the next following stand the predetermined admissible maximum angle of the displacement has been obtained and the joints of this thrust member have likewise become stiff. At this instant, also the next following stand is carried along and is displaced laterally, and so forth one stand after another until the stand carrying the reversing drum has been moved to the desired position. The thrust members of the thus displaced stands, therefore, form a polygon as shown in Fig. 2 the sides of which form angles with each other which cannot exceed the admissible maximum degree. The radius of curvature described by the belt conveyor is dependent on the length of the thrust members 52. With curves having a large radius, the thrust members are elongated, whereas with curves of small radius the thrust members are shortened.

It is a matter of course that each desired part of the belt conveyor may be laterally displaced while the joints 54, 55 prevent in similar manner that a certain angular relative position of two adjacent stands will be exceeded.

The invention is applicable not only in connection with belt conveyors which are adapted to pass through curves and in which the belt passes over rollers journalled in stands, but may also be employed in connection with belt conveyors in which the belt is provided with running rollers by means of which the belt rolls on rails carried by stands, provided of course, that the rail is so elastic or is provided with parts which are at least so elastic that the rail can follow the movement of the stands. When employing a central rail with running surfaces for the supporting and guiding rollers of the conveyor belt, for instance, within the range of the joints, a flexible rail section of rubber may be inserted into the rail which will allow the rail to bend within the limits predetermined by the joints. When the conveyor belt moves on double rails, it is self-understood that, in addition to flexibility, also a stretchability of the rail in longitudinal direction will be necessary.

It is, of course, understood that the present invention is, by no means, limited to the particular construction shown in the drawings but also comprises any modifications within the scope of the appended claims.

What I claim is:

1. In a belt conveyor system including a conveyor belt adapted to pass through curves, the combination of: a plurality of supporting stands arranged in spaced relationship to each other for supporting said belt, means associated with said stands to allow displacement of said stands at least in a direction perpendicular to the conveying direction of said belt, each of said stands having at least one side thereof provided with a longitudinal socket fixedly connected to the respective stand, a plurality of thrust members respectively interposed between each two adjacent stands, each end of said thrust members being provided with a threaded bore, and connecting members having a threaded shaft respectively threadedly engaging the threaded bores in said thrust members and also provided with a ball-shaped head respectively movably engaging the adjacent socket of the respective adjacent supporting stand within certain limits to thereby limit the angular relative displacement of each two adjacent stands, said thrust members when in axial alignment with each other being located in a vertical plane extending substantially through the longitudinal central axis of said belt.

2. In a belt conveyor system including a conveyor belt adapted to pass through the curves, the combination of: a plurality of supporting stands arranged in spaced relationship to each other for supporting said belt, means associated with said stands to allow displacement of said stands at least in a direction perpendicular to the conveying direction of said belt, a plurality of thrust members respectively interposed between each two adjacent stands, and a plurality of joints including a first member in form of a longitudinal socket and a second member in form of a ball journalled in said socket and movable therein in longitudinal direction of said socket, each of the transverse sides of each of said stands having fixedly connected thereto one member of said joints, and each end of each thrust member having fixedly connected thereto the respective other members of said joints, the vertical planes through said joints in the direction of movement of said belt passing substantially through the longitudinal central axis of said belt.

3. A belt conveyor system according to claim 2, with an endless conveyor belt having a tight strand and a slack strand, in which said thrust members are substantially equally spaced in vertical direction from said tight strand and said slack strand.

References Cited in the file of this patent

UNITED STATES PATENTS

| | | |
|---|---|---|
| 1,548,278 | Phillips et al. | Aug. 4, 1925 |
| 1,933,404 | Allen et al. | Oct. 31, 1933 |
| 2,552,885 | Claud-Mantle | May 15, 1951 |